Sept. 27, 1960
A. O. FRENZEL
2,954,472
SAMPLE CELL FOR RADIATION ANALYZER
Filed Aug. 19, 1957
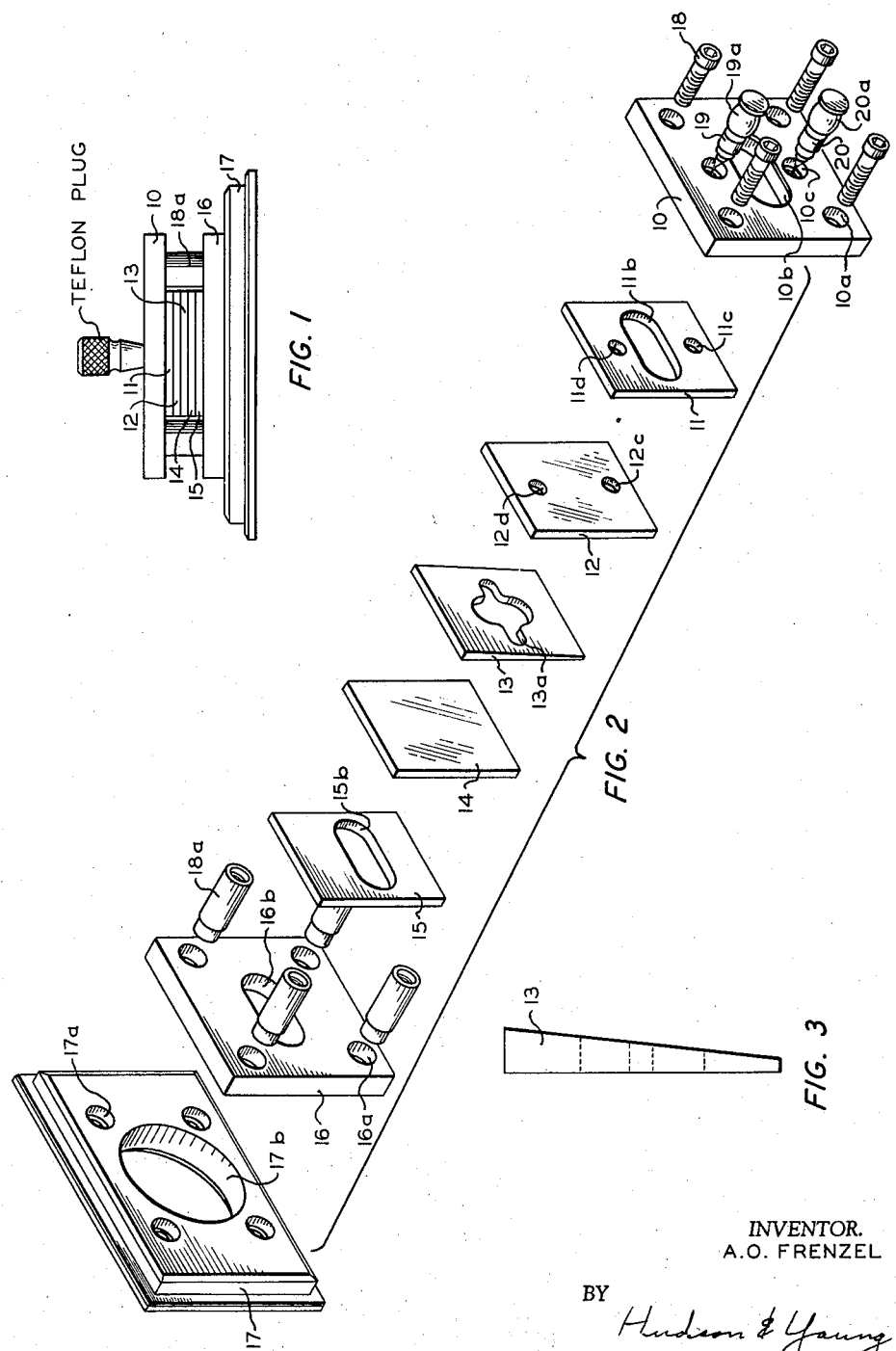
INVENTOR.
A.O. FRENZEL
BY
*Hudson & Young*
ATTORNEYS

2,954,472
SAMPLE CELL FOR RADIATION ANALYZER

Alfon O. Frenzel, Bartlesville, Okla., assignor to Phillips Petroleum Company, a corporation of Delaware Filed Aug. 19, 1957, Ser. No. 678,830

6 Claims. (Cl. 250—43.5)

This invention relates to an improved cell for use in analytical instruments employing radiation.

Heretofore, considerable difficulties have arisen in providing sample cells for use in analytical instruments utilizing radiation, particularly where the sample to be analyzed contains water. Where the windows of the cell are formed from hygroscopic materials, such as sodium chloride or potassium bromide, the windows become etched and fogged where water-containing samples are used for extended periods, as in routine analysis.

The aforementioned difficulties can, to a large extent, be overcome by the use of germanium as the window material, and to a lesser extent, silicon. Germanium and silicon have excellent transmissibility in the 2 to 15 micron region of the infrared spectrum, as well as at other regions of interest in analytical work. They are rigid, resistant to thermal shock, and can be used at sample temperatures varying from 38° C. to as low as minus 190° C.

Unfortunately, however, germanium and silicon have the undesirable property of high reflectance which causes a troublesome superposition of interference fringes on liquid sample spectra, and the germanium and silicon are also somewhat more opaque to radiant energy than the commonly used hygroscopic materials.

In accordance with the invention, the foregoing difficulties with germanium or silicon windows are eliminated by providing a wedge-shaped spacer within the cell assembly, and by somewhat increasing the slit width on the radiation beam. It has been found that such a wedge-shaped spacer substantially eliminates the interference pattern otherwise produced by the cell windows, and enables accurate reproducible results to be obtained over long periods of time with hygroscopic samples.

Accordingly, it is an object of the invention to provide an improved cell for an analytical instrument utilizing radiation.

It is a further object to provide a cell which produces accurate reproducible results over extended periods of time with hygroscopic samples.

It is a still further object to provide a cell which is economical to construct, sufficiently rugged to withstand hard usage, and which is convenient to assemble and disassemble.

Various other objects, advantages and features of the invention will become apparent from the following detailed description taken in conjunction with the accompanying drawings in which:

Figure 1 is a view of the cell with the parts in assembled relation;

Figure 2 is an exploded view of the cell; and

Figure 3 is a detailed end view of the spacer.

Referring now to the drawings in detail, the assembly includes a frontal plate 10, a sealing gasket 11, formed from rubber, polytetrafluoroethylene or like material, a germanium or silicon plate or window 12, a wedge-shaped polyethylene spacer 13, a germanium or silicon plate 14, a sealing plate or gasket 15, formed from synthetic rubber, such as neoprene, polytetrafluoroethylene or similar material, an aluminum spacer 16 and a backing plate 17. These parts are held in assembled relation by cap screws 18 which extend through openings 10a in the plate 10, and openings 16a in the spacer 16 into spacer pin assemblies 18a in the backing plate 17. The parts 10, 11, 15 and 16 are provided, respectively, with elongated slits 10b, 11b, 15b and 16b which are mounted in alignment when the cell is assembled, and which are also in alignment with a relatively large circular opening 17b in the plate 17.

The frontal plate 10 is further provided with openings 10c, 10d which register, respectively, with openings 11c, 11d in the gasket 11 and with openings 12c, 12d in the plate 12. These openings are closed by hypodermic needle receptacles 19, 20 fitted with plugs 19a, 20a, respectively, which allow sample or standard material to be introduced into or withdrawn from the cell.

It will be apparent that when the parts are assembled as described, a sealed cell assembly is defined suitable for use with hygroscopic liquids, the cell proper being defined by the windows 12, 14 and the spacer 13, and the sealing being effected by the gaskets 11 and 15. As previously indicated, the germanium or silicon is highly resistant to moisture and to thermal shock so the cell has excellent properties for analysis by radiation, especially infrared radiation.

In accordance with the invention, interference fringes caused by the high reflectance of the germanium or silicon plates are eliminated by use of the wedge-shaped spacer 13. Preferably and advantageously, this spacer is made from high density polyethylene having an unannealed density of at least 0.94 at 20° C., a molecular weight of at least 30,000, a melting point of at least 132° C. by the heat of fusion method and a crystallinity of at least 80%. Such high density polyethylene is very advantageous due to its high resistance to moisture, and hydrocarbon sample materials.

The spacer 13 has an interior cut-out portion 13a, the central part of which holds the sample in the path of the radiation beam, and the end portions of which communicate with the openings in the parts 10, 11, 12 to allow sample material to be introduced into the cell and withdrawn therefrom. The spacer, accordingly, essentially provides a wedge-shaped sample in the path of the beam.

In the specific embodiment shown, the spacer was formed by heating a film of the polymer in a wedge-shaped mold and cutting out a section after cooling so that the final spacer had a thickness change of 30 percent throughout the length of the slit defined by the openings 11b, 15b and 16b, which was 37 millimeters. In general, a desirable reduction of interference fringes is observed where the thickness change is from about 0.8 to 1.5 percent per millimeter along the axis of the slit. Larger thickness changes effect a proportionate decrease in the interference pattern but decrease the amount of radiation transmitted by the cell.

Testing of the described cell structure with various solvents, such as carbon disulfide, and 2-picoline showed the leakage characteristics to be entirely satisfactory. Reproducibility of spectra was also very satisfactory, as determined by comparing spectra made by filling, recording and emptying the cells on successive days using diphenylmethane as solvent. No interference resulting from high reflectance of the germanium or silicon was noted, but interference of a high degree was observed when a flat polytetrafluoroethylene spacer was substituted for the tapered high density polyethylene spacer.

It will be apparent, therefore, that I have achieved the objects of the invention in providing a leak-proof cell for an analyzing instrument utilizing radiation which is adapted for use with water-containing samples without etching or fogging of the cell windows. Further, I have provided a cell which is highly resistant to thermal shock, and free from interference caused by the high reflectance of the germanium or silicon.

In one specific example, germanium plates 12, 14 were each 2 millimeters thick, 25 millimeters wide and 37 millimeters long. Thus, the cell was built to require a minimum amount of germanium. The sealing gaskets were 100 microns thick, and the slits were 19 millimeters long and 10 millimeters wide.

The window in the frontal plate 10 was made slightly shorter than the cross-section of the incident radiation beam so as to mask about 3 percent of the energy in the incident beam. This prevents changes in vertical positioning of the cell from being critical in that such changes will not affect the effective thickness of the absorbing path.

While the invention has been described in connection with a present, preferred embodiment thereof, it is to be understood that this description is illustrative only and is not intended to limit the invention.

I claim:

1. A cell for an analyzer utilizing radiation which comprises, in combination, a pair of windows of material selected from the group consisting of germanium and silicon, a wedge-shaped spacer mounted between said windows so that said windows are slanted with respect to each other, said spacer having a portion cut out to accommodate a sample, means for holding the foregoing parts in assembled relation, and means for introducing material into said cell and withdrawing material therefrom.

2. A cell for an analyzer utilizing radiation which comprises, in combination, a pair of windows of material selected from the group consisting of germanium and silicon, a wedge-shaped spacer of high density polyethylene mounted between said windows so that said windows are slanted with respect to each other, said spacer having a portion cut out to accommodate a sample, means for holding the foregoing parts in assembled relation, and means for introducing material into said cell and withdrawing material therefrom.

3. A cell for an anlyzer utilizing radiation which comprises, in combination, a pair of windows of material selected from the group consisting of germanium and silicon, a wedge-shaped spacer mounted between said windows so that said windows are slanted with respect to each other, there being a thickness change of about 0.8 to 1.5 percent per millimeter along the axis of the wedge, said spacer having a portion cut out to accommodate a sample, means for holding the foregoing parts in assembled relation, and means for introducing material into said cell and withdrawing material therefrom.

4. A cell for an analyzer utilizing radiation which comprises, in combination, a pair of germanium windows, a wedge-shaped spacer mounted between said windows so that said windows are slanted with respect to each other, there being a thickness change of about 0.8 to 1.5 percent per millimeter along the axis of the wedge, said spacer having a portion cut out to accommodate a sample, means for holding the foregoing parts in assembled relation, and means for introducing material into said cell and withdrawing material therefrom.

5. A cell for an analytical instrument comprising, in combination, a frontal plate and a backing plate; a pair of germanium plates interposed between said frontal plate and said backing plate; a sealing gasket between said backing plate and one germanium plate; a sealing gasket between said frontal plate and the other germanium plate; a wedge-shaped spacer between said plates constructed and arranged so that the germanium plates converge toward each other, thus defining a cell; said backing plate, said frontal plate and said gaskets each having an opening therein defining an elongated slit, the thickness change of said spacer occurring along the axis of said slit; means for holding the foregoing parts in rigid assembled position; a pair of openings extending through the frontal plate, the adjacent sealing gasket and germanium plate to the interior of the cell; and detachable plug means in said openings.

6. A cell for an analytical instrument comprising, in combination, a frontal plate and a backing plate; a pair of germanium plates interposed between said frontal plate and said backing plate; a sealing gasket between said backing plate and one germanium plate; a sealing gasket between said frontal plate and the other germanium plate; a wedge-shaped spacer of high density polyethylene between said plates constructed and arranged so that the germanium plates converge toward each other, thus defining a cell; said backing plate, said frontal plate and said gaskets each having an opening therein defining an elongated slit, the thickness change of said spacer occurring along the axis of said slit, said thickness change being within the range of about 0.8 to 1.5 percent per millimeter along said axis; means for holding the foregoing parts in rigid assembled position; a pair of openings extending through the frontal plate, the adjacent sealing gasket and germanium plate to the interior of the cell; and detachable plug means in said openings.

References Cited in the file of this patent

UNITED STATES PATENTS

| | | |
|---|---|---|
| 2,545,162 | Muly | Mar. 13, 1951 |
| 2,637,817 | Herbert | May 5, 1953 |